Figure 1:
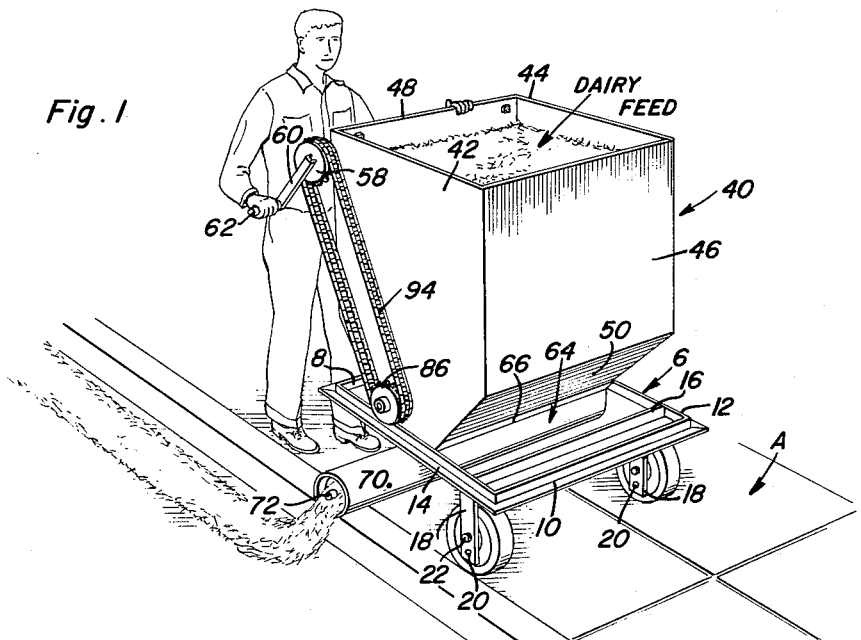

Aug. 3, 1965　　　E. A. SCHREIBER, JR　　　3,198,398
MANUALLY MANEUVERABLE CATTLE FEEDING CART

Filed May 12, 1964　　　2 Sheets-Sheet 1

Edward A. Schreiber, Jr.
INVENTOR.

BY *Clarence A. O'Brien*
*and Harvey B. Jacobson*
Attorneys

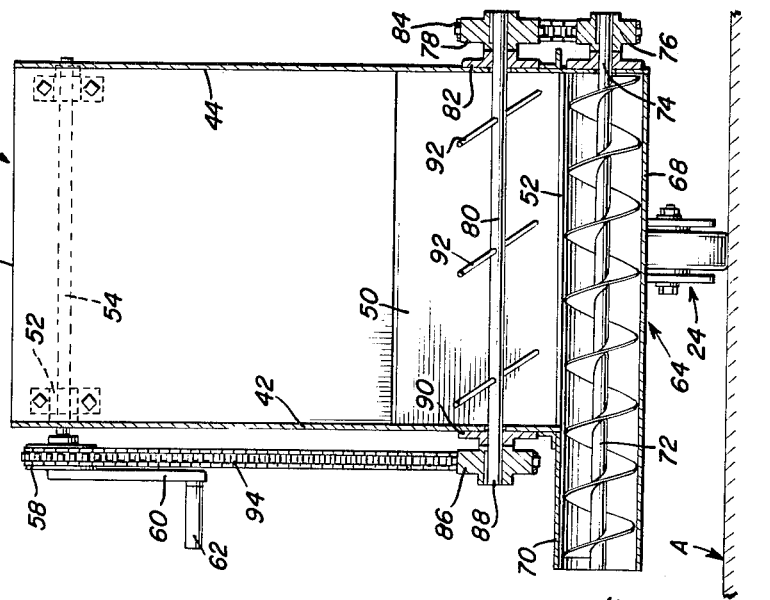
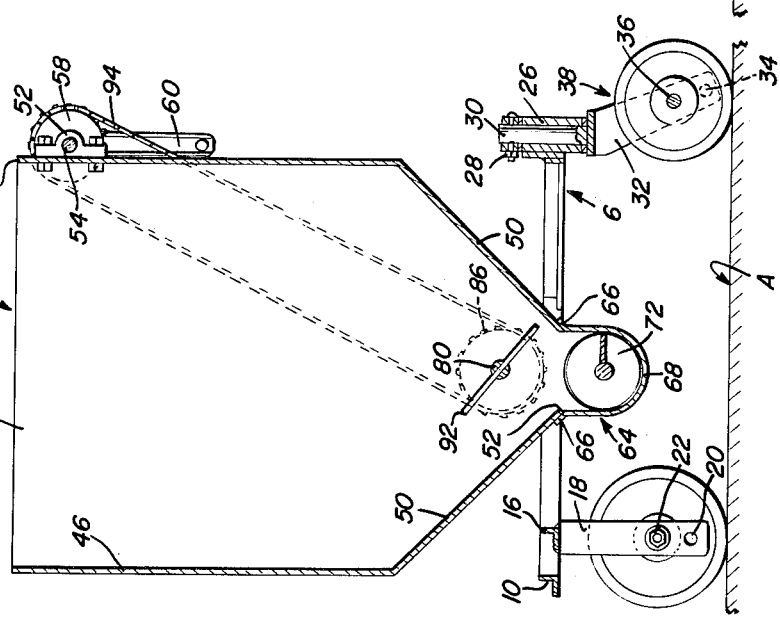

United States Patent Office 3,198,398
Patented Aug. 3, 1965

3,198,398
MANUALLY MANEUVERABLE CATTLE
FEEDING CART
Edward A. Schreiber, Jr., R.F.D. 1, Mosinee, Wis.
Filed May 12, 1964, Ser. No. 366,710
7 Claims. (Cl. 222—176)

This invention relates to a manually maneuverable wheel-supported cart for expeditiously transporting and effectually dispensing dairy feed, either ground or in pellet form, to dairy cattle, and has to do with a time and labor-saving cart capable of being controllably pushed along a walkway for selectively delivering the feed to mangers whether sunken below or elevated above the level of the walkway which is traversed.

The improved cart is simple in construction, can be maneuvered in any required manner and direction, can clear and be pushed through any 36" opening or along a narrow 24" platform, has a carrying capacity up to 300 pounds, has a low loading height, can dispense any amount of feed desired at each stopping place or the entire amount at a single stopping place, and is equipped with a discharge spout which does not frighten the cattle as they are approached one by one.

The invention features the construction above described in conjunction with an agitator shaft. This shaft is mounted for rotation in the container or receptacle portion of the hopper and is located in a plane directly above the slot and trough. The shaft has radially projecting agitating fingers and these are longitudinally spaced in an orderly manner and are proportional in length with the width of the slot and are accordingly adapted when operating to prevent bridging of the outgoing feed. The aforementioned operating means is operatively connected with the shaft.

Novelty is also predicated on the conveyor operating means which comprises a rotatably mounted upper sprocket wheel carrying a handcrank, a lower companion sprocket wheel carried by one end of the agitator shaft, and an endless sprocket chain which is trained over the sprocket wheel.

With a view toward achieving best controllable and maneuverable results the agitator driving sprocket wheel and the handcrank sprocket wheel and chain are located on a side wall of the hopper adjacent the right hand of the walking attendant. The agitator shaft transmits motion to the screw conveyor by way of sprocket wheels and an accompanying chain located at the bottom of the wall, that is, the vertical side wall, to the left of the walking attendant.

Figure 2:
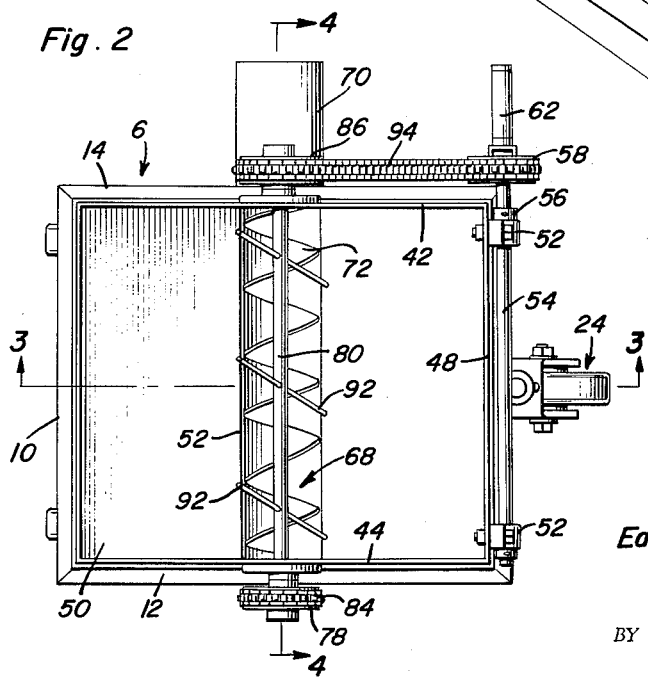

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing the improved manually maneuverable and controllable cattle feeding cart and illustrating how it is pushed by a walking attendant along a platform or walkway with the discharging feed being delivered into sunken type mangers;

FIGURE 2 is a top plan view on a slightly enlarged scale of the cart shown in FIGURE 1; and FIGURES 3 and 4 are sections at right angles to each other taken on the plane of the section lines 3—3 and 4—4, respectively, of FIGURE 2.

Referring first to the portable or rollable and maneuverable base frame it will be noted that this is denoted, generally speaking, by the numeral 6. This frame is preferably rectangular in plan and is made up of connected coplanar angle irons; namely, a rearward angle iron 8, a forward angle iron 10, a side angle iron 12 and an opposed side angle iron 14. It may be stated here that inasmuch as the cart is being illustrated as moving along the walkway A in a direction from left to right the walking attendant is therefore at the left and is assumed to be pushing the cart forwardly. There is an auxiliary angle iron 16 embodied in the frame and the end portions of this serve to support a pair of opposed parallel fixed depending legs or brackets 18 having selectively usable bearing holes 20 to accommodate the wheel journaling means 22. Any number of bearing holes can in practice be provided, the idea being to enable the level or elevation of the base frame 6 to be raised and lowered. This same adjustment principle is embodied in the single centrally positioned swivel-type trailing wheel 24. With reference to FIGURE 3 it will be seen that a vertical sleeve 26 is bracketed at 28 to the rearward angle iron and serves to accommodate the spindle 30 carrying the fork 32 the arms of which have bearing holes 34 to adjustably mount the axle 36 of the wheel 38.

This freely rotatable and controllable base means supports the rigidly mounted upstanding feed-containing and dispensing hopper denoted generally at 40. The hopper is open at its top and comprises integral flat walls; namely, one wall 42 to the right of the operator or attendant, an opposed wall 44 to his left, a front wall 46 and a rear wall 48. The lower end portions of the front and rear walls have portions which slope inwardly toward each other as at 50 with their adjacent edges defining a discharge slot 52 for the feed (FIG. 3). The upper portion of the rear wall 48 is provided exteriorly with suitable bearings 52 for a shaft 54 held in place by limit stop collars 56. One end portion of this shaft projects beyond the righthand wall 42 where it is provided with a sprocket wheel 58 having a crank 60 attached thereto, said crank provided with a suitable handgrip 62.

With reference now to the discharge slot at the bottom portion of the hopper it will be noted that a tubular member 64 is horizontally disposed and is suspended on the median portion of the base frame 6. The righthand portion (right in FIG. 1) is split and provided with flanges 66 which are fastened for cooperation with the aligned discharge slot. This portion of the tubular member provides a trapping and augering trough 68. It will be noted that the tubular end portion 70 at the left in FIG. 4 provides a short protruding or projecting spout. The spout and trough serve to accommodate a screw conveyor 72 having a shaft or journal 74 journaled in an appropriate exterior bearing and carrying a sprocket wheel 76. This sprocket wheel is in line with a complemental sprocket wheel 78 on the projecting end portion of an agitator shaft 80. A suitable bearing is provided as at 82 and a sprocket chain 84 is trained over the two sprocket wheels herein referred to as first and second sprocket wheels 76 and 78. There is a third sprocket wheel 86 mounted on the protruding end portion 88 of the agitator shaft which is journaled in an appropriate bearing 90. The agitator shaft is provided at longitudinally spaced points with several centrally anchored rods constituting agitating fingers 92. These fingers are so spaced and are proportional to the slot and trough to insure good agitation and to prevent bridging of the outgoing feed.

The sprocket wheel 86 is in line and cooperable with the aforementioned sprocket wheel 58 which for purposes of description and claims is referred to as a fourth sprocket wheel. The long endless sprocket chain 94 is trained over these sprocket wheels 58 and 86. It follows therefore that by turning the handcrank in a predetermined direction the shaft 54 and agitator shaft 80 are simultaneously rotated, this as a result of the motion transmitted from the sprocket wheel 53 to the sprocket wheel 86 by way of the companion chain 94. The agitator shaft in turn transmits motion to the sprocket wheel 78 which in turn operates the companion sprocket wheel 76 by way of the accompanying endless sprocket chain 84. Accordingly, the screw conveyor 72 is operated in a manner to deliver the gravitating feed from the hopper and trough to and outwardly beyond the discharge spout 70.

It is to be pointed out here that while the motion transmitting means in respect to the shafts is described as comprising sprocket wheels and accompanying sprocket chains, it is to be understood that V-belts and V-type pulleys may, of course, be used with equally successful results.

It is further believed that a careful consideration of the specification including the statement of the invention and the significant objectives and features and advantages, when taken in conjunction with the views of the drawings, will enable the reader to obtain a clear and comprehensive understanding of the invention and the contemplated best mode of using the same. Accordingly, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mobile manually maneuverable cart adapted to be pushed along a walkway while transporting and dispensing dairy feed to a cattle manger comprising: a wheel-supported hopper for the feed (in either ground or pellet form) said hopper having a wholly open top portion and being of a vertical height that the walking attendant can load the container portion at a convenient level and can walk behind the cart and push it along unhampered in whatever direction and manner desired, said hopper having sloping feed gravitating walls and a discharge slot at its bottom discharging into a trough underlying and aligned with said slot, said trough being closed at one end and open and provided at its other end with an aligned discharge spout, the latter projecting a limited distance beyond the vertical plane of the adjacent vertical hopper wall, said spout being rigid and positioned at the dispensing level desired, a screw conveyor confined and mounted for rotation in said trough and for augering and delivering the feed from the trough and emptying the same by way of said spout, and operating means for said conveyor supported on an exterior side wall of the hopper and having a handcrank located at a rearward upper corner portion of said hopper so that the attendant has control of the rate of delivery and amount of feed which is to be dispensed at a given time and place, whereby cattle can be selectively fed in keeping with the intentions of the attendant.

2. The structure defined in claim 1, and in combination, an agitator shaft mounted for rotation in said hopper in a plane directly above said slot and trough, said shaft having radially projecting agitating fingers proportional in length with the width of said slot and adapted when operating to prevent bridging of the outgoing feed, operating means being operatively connected to said shaft.

3. The structure defined in claim 1, and in combination, an agitator shaft mounted for rotation in said hopper in a plane directly above said slot and trough, said shaft having radially projecting agitating fingers proportional in length with the width of said slot and adapted when operating to prevent bridging of the outgoing feed, said operating means being operatively connected to said shaft, and an operating connection between said shaft and an end of said conveyor remote from the locale of said spout.

4. The structure according to claim 3, and wherein said conveyor operating means comprises a rotatably mounted upper sprocket wheel carrying said handcrank, a lower companion sprocket wheel carried by one end of said shaft, and an endless sprocket chain trained over said sprocket wheels.

5. The invention defined in claim 4, and wherein said operating connection comprises a sprocket wheel on the other end of said shaft, a complemental sprocket wheel carried by an end of said conveyor, and a sprocket chain trained over said last-named sprocket wheels.

6. A mobile manually maneuverable cart adapted to be pushed along a walkway while transporting and dispensing dairy feed to a cattle manger comprising: a wheel-supported hopper for the feed (in either ground or pellet form) said hopper having a wholly open top portion and being of a vertical height that the walking attendant can load the container portion at a convenient level and can walk behind the cart and push it along unhampered in whatever direction and manner desired, said hopper having sloping feed gravitating walls and a discharge slot at its bottom discharging into a trough underlying and aligned with said slot, said trough being closed at one end and open and provided at its other end with an aligned discharge spout, the latter projecting a limited distance beyond the vertical plane of the adjacent vertical hopper wall, said spout being rigid and positioned at the dispensing level desired, a screw conveyor confined and mounted for rotation in said trough and for augering and delivering the feed from the trough and emptying the same by way of said spout, said conveyor having an axial shaft with an end journaled in a bearing provided therefor on a side of the hopper remote from said spout and projecting outwardly of the adjacent hopper wall and provided with a first sprocket wheel, an agitator shaft spanning the receptacle portion of said hopper in a plane and position above and parallel to said slot and trough and with its ends journaled in bearings provided therefor in the opposite side walls of said hopper, said ends projecting outwardly beyond said side walls and having second and third sprocket wheels affixed thereto, said second sprocket wheel being proximal to said first sprocket wheel, a first sprocket chain trained over said first and second sprocket wheel, a fourth sprocket wheel mounted for rotation on an upper rearward corner portion of said hopper within convenient reach of the attendant and having an operating handcrank, and a second sprocket chain trained over the third and fourth sprocket wheels.

7. The structure defined in claim 6, and wherein said third sprocket wheel is located adjacent to but in a plane above said spout, said fourth sprocket wheel being carried by a shaft which is mounted for rotation in bearings, said shaft extending across the upper rearward wall of said hopper.

References Cited by the Examiner

UNITED STATES PATENTS

| | | | |
|---|---|---|---|
| 1,071,482 | 8/13 | Umholtz | 222—238 |
| 1,095,383 | 5/14 | Cole | 222—238 |
| 1,463,457 | 7/23 | Beckmann | 222—238 X |
| 2,489,801 | 11/49 | Myott | 222—176 X |

LOUIS J. DEMBO, *Primary Examiner.*

CHARLES R. CARTER, *Examiner.*